(12) United States Patent
Kumagai et al.

(10) Patent No.: US 11,615,273 B2
(45) Date of Patent: Mar. 28, 2023

(54) CREATING APPARATUS, CREATING METHOD, AND CREATING PROGRAM

(71) Applicant: NIPPON TELEGRAPH AND TELEPHONE CORPORATION, Chiyoda-ku (JP)

(72) Inventors: Atsutoshi Kumagai, Musashino (JP); Tomoharu Iwata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 1316 days.

(21) Appl. No.: 16/064,659

(22) PCT Filed: Jan. 19, 2017

(86) PCT No.: PCT/JP2017/001775
§ 371 (c)(1),
(2) Date: Jun. 21, 2018

(87) PCT Pub. No.: WO2017/130835
PCT Pub. Date: Aug. 3, 2017

(65) Prior Publication Data
US 2019/0012566 A1    Jan. 10, 2019

(30) Foreign Application Priority Data

Jan. 27, 2016  (JP) .............................. JP2016-013430

(51) Int. Cl.
*G06K 9/62* (2022.01)
*G06F 16/906* (2019.01)
*G06N 20/10* (2019.01)
*G06N 7/00* (2023.01)
*G06N 20/00* (2019.01)

(52) U.S. Cl.
CPC ........... *G06K 9/626* (2013.01); *G06F 16/906* (2019.01); *G06K 9/6255* (2013.01);
(Continued)

(58) Field of Classification Search
CPC .... G06K 9/626; G06K 9/6255; G06K 9/6259; G06K 9/6262; G06K 9/6267;
(Continued)

(56) References Cited

U.S. PATENT DOCUMENTS 8,200,549 B1 *   6/2012  Crean ................ G06Q 30/0202
                                                    705/26.64
2006/0015561 A1  1/2006  Murphy et al.
(Continued)

FOREIGN PATENT DOCUMENTS

JP        2006-012165 A      1/2006

OTHER PUBLICATIONS

Koychev, I., "*Gradual Forgetting for Adaptation to Concept Drift*", Proceedings of ECAI 2000 Workshop on Current Issues in Spatio-Temporal Reasoning, Berlin, 2000, 6 pages.
(Continued)

*Primary Examiner* — Allen C Wong
(74) *Attorney, Agent, or Firm* — Oblon, McClelland, Maier & Neustadt, L.L.P.

(57) ABSTRACT

In a classifier whose classification accuracy is maintained without frequently collecting labeled learning data, a learning unit learns a classification criterion of a classifier at each time point in the past until the present and learns a time series change of the classification criterion by using data for learning to which a label is given and that is collected until the present. A classifier creating unit predicts a classification criterion of a future classifier and creates a classifier that outputs a label representing an attribute of input data by using the learned classification criterion and time series change.

8 Claims, 12 Drawing Sheets

(52) U.S. Cl.
CPC ......... *G06K 9/6259* (2013.01); *G06K 9/6262* (2013.01); *G06K 9/6267* (2013.01); *G06N 7/00* (2013.01); *G06N 7/005* (2013.01); *G06N 20/00* (2019.01); *G06N 20/10* (2019.01)

(58) Field of Classification Search
CPC ...... G06F 16/906; G06N 20/00; G06N 20/10; G06N 7/00; G06N 7/005
USPC ........................................................... 706/12
See application file for complete search history.

(56) References Cited

U.S. PATENT DOCUMENTS

| | | | |
|---|---|---|---|
| 2007/0260568 A1 | 11/2007 | Perng et al. | |
| 2008/0071721 A1 | 3/2008 | Wang et al. | |
| 2011/0161743 A1* | 6/2011 | Kato | G06F 11/0709 714/47.2 |
| 2015/0305686 A1* | 10/2015 | Coleman | A61B 5/38 600/301 |

OTHER PUBLICATIONS

Shimodaira, H., "*Improving predictive inference under covariate shift by weighting the log-likelihood function*", Journal of Statistical Planning and Inference 90 (2000), Elsevier Science B.V., 2000, pp. 227-244.

International Search Report dated Feb. 14, 2017 in PCT/JP2017/001775, filed on Jan. 19, 2017.

* cited by examiner

CREATING APPARATUS, CREATING METHOD, AND CREATING PROGRAM

FIELD

The present invention relates to a creating apparatus, a creating method, and a creating program.

BACKGROUND

There is known a classifier that outputs a label representing the attribute of certain data in a case where the data is input in machine learning. For example, in a case where a newspaper article as data is input to the classifier, a label of politics, economy, sports, or the like is output. Learning, that is, the creation of a classifier is performed by using labeled learning data obtained by combining data for leaning and a label of this learning data.

A classification criterion of the classifier may change over time. For example, a spam mail creator always creates spam mails with new features to slip through a classifier. Therefore, a classification criterion for spam mails changes with the passage of time, and the classification accuracy of the classifier greatly deteriorates.

In order to prevent temporal deterioration of the classification accuracy of such a classifier, it is necessary to create a classifier whose classification criterion is updated (hereinafter also referred to "update the classifier"). Therefore, there is disclosed a technique that continuously collects labeled learning data and updates a classifier by using the latest labeled learning data collected (see Non Patent Literatures 1 and 2).

CITATION LIST

Non Patent Literature

Non Patent Literature 1: I. Koychev, "Gradual Forgetting for Adaptation to Concept Drift", Proceedings of ECAI 2000 Workshop on Current Issues in Spatio-Temporal Reasoning, Berlin, 2000, p. 101-107

Non Patent Literature 2: H. Shimodaira, "Improving predictive inference under covariate shift by weighting the log-likelihood function", Journal of Statistical Planning and Inference 90(2000), 2000, p. 227-244

SUMMARY

Technical Problem

However, since the labeled learning data is obtained by giving a label to each piece of learning data by an expert, it is difficult to continuously collect labeled learning data and frequently update the classifier. Furthermore, in a case where the classifier is used in a closed environment, the update of the classifier or the application of an updated classifier is difficult. For example, although an update file of antivirus software, that is, the updated classifier is periodically distributed in a security domain, in a case where the antivirus software is used in the closed environment, it is difficult to apply the updated classifier.

The present invention has been made in view of the above. It is an object of the present invention to create a classifier whose classification accuracy is maintained without frequently collecting labeled learning data.

Solution to Problem

A creating apparatus that creates a classifier that outputs a label representing an attribute of input data, the creating apparatus includes: a classifier learning unit that learns a classification criterion of a classifier at each time point in the past; a time series change learning unit that learns a time series change of the classification criterion; and a predicting unit that predicts a classification criterion of a future classifier by using the learned classification criterion and time series change.

Advantageous Effects of Invention

According to the present invention, it is possible to create a classifier whose classification accuracy is maintained without frequently collecting labeled learning data.

DESCRIPTION OF EMBODIMENTS

First Embodiment

Hereinafter, an embodiment of the present invention will be described in detail with reference to the drawings. Note that the present invention is not limited by this embodiment. Furthermore, in the description of the drawings, the same reference signs are attached to the same parts.

[Configuration of Creating Apparatus]

First, a schematic configuration of a creating apparatus according to the present embodiment will be described with reference to FIG. 1. A creating apparatus 1 according to the present embodiment is achieved by a general-purpose computer such as a workstation or a personal computer, executes creation processing to be described later and creates a classifier that outputs a label representing attributes of input data.

Figure 1:
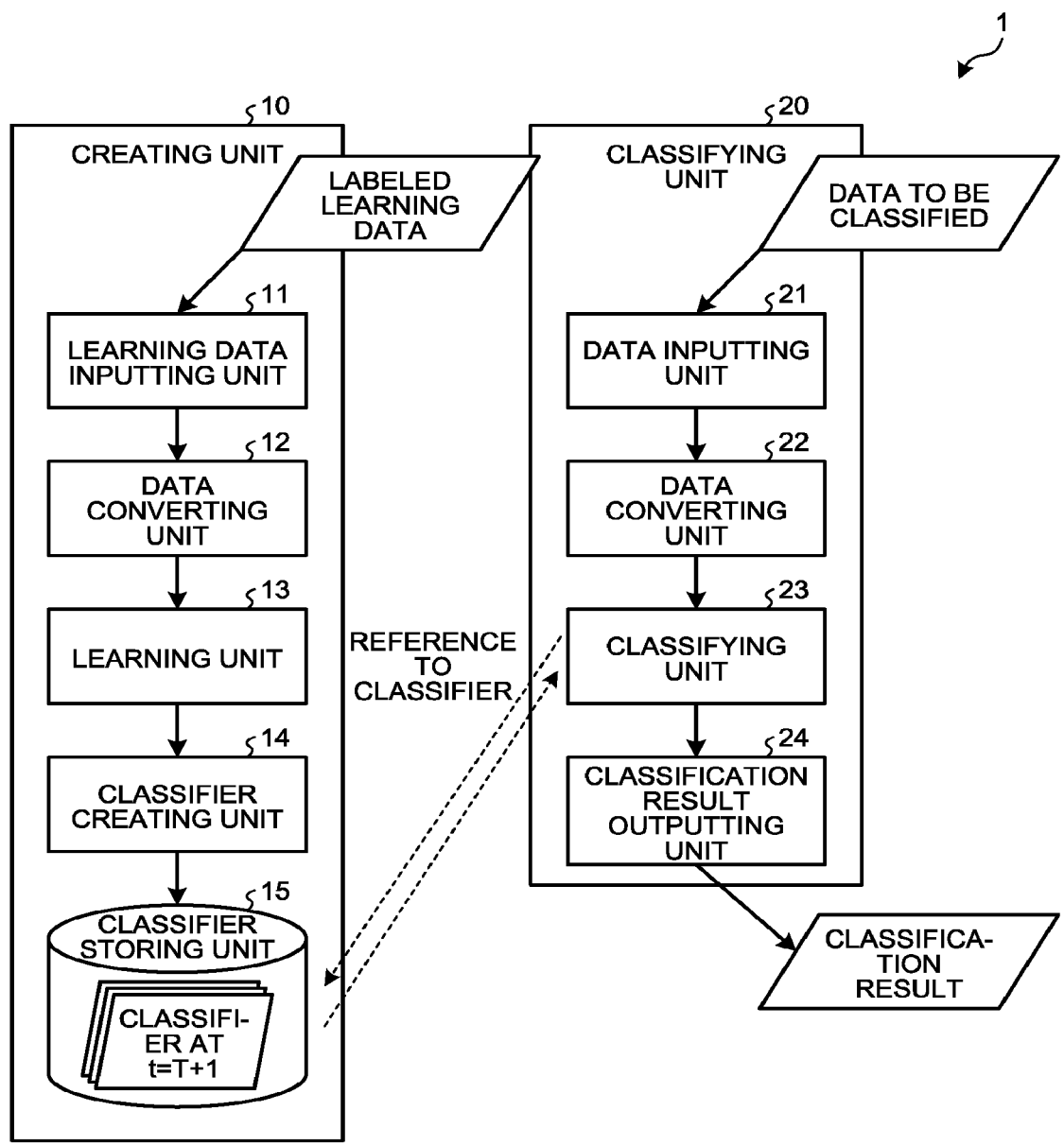
FIG. 1 is a schematic diagram illustrating a schematic configuration of a creating apparatus according to a first embodiment of the present invention.

Note that as illustrated in FIG. 1, the creating apparatus 1 of the present embodiment includes a classifying unit 20 that performs classification processing in addition to a creating unit 10 that performs the creation processing. The classifying unit 20 performs the classification processing of classifying data and outputting a label by using a classifier created by the creating unit 10. The classifying unit 20 may be mounted on the same hardware as that of the creating unit 10 or may be mounted on different hardware.

[Creating Unit]

The creating unit 10 includes a learning data inputting unit 11, a data converting unit 12, a learning unit 13, a classifier creating unit 14, and a classifier storing unit 15.

The learning data inputting unit 11 is achieved by using an input device such as a keyboard and a mouse, and inputs various instruction information to a control unit in response to an input operation by an operator. In the present embodiment, the learning data inputting unit 11 receives labeled learning data to be used for the creation processing.

Here, the labeled learning data means a combination of data for learning and a label of this learning data. For example, in a case where the learning data is text, the learning data is given a label of politics, economy, sports, or the like that represents contents of the text. Furthermore, the labeled learning data is given time information. For example, in a case where the learning data is text, the time information means date and time or the like when the text was published. In the present embodiment, a plurality of pieces of labeled learning data given information of different time in the past until the present is received.

Note that the labeled learning data may be input to the creating unit 10 from an external server device or the like via a communication control unit (not illustrated) achieved by a network interface card (NIC) or the like.

The control unit is achieved by using a central processing unit (CPU) or the like that executes a processing program, and the control unit functions as the data converting unit 12, the learning unit 13, and the classifier creating unit 14.

The data converting unit 12 converts the received labeled learning data into data of a combination of collection time, a feature vector, and a numerical label, as preparation for processing in the learning unit 13 described later. The labeled learning data in the processing of the creating unit 10 below means data after conversion by the data converting unit 12.

Here, the numerical label is obtained by converting the label given to the labeled learning data into a numerical value. Furthermore, the collection time represents discretized time given to the data on the basis of the time information. The time information of the labeled learning data received within the same time window is converted to the same collection time.

Furthermore, the feature vector is obtained by expressing, in an n-dimensional number vector, a feature of the received labeled learning data. The learning data is converted by a general-purpose method in machine learning. For example, in a case where the learning data is text, the feature vector is converted by a morphological analysis, n-gram, or delimiter.

The learning unit 13 functions as a classifier learning unit that learns a classification criterion of the classifier at each time point in the past until the present. Furthermore, the learning unit 13 functions as a time series change learning unit that learns a time series change of the classification criterion. In the present embodiment, the learning unit 13 performs processing as the classifier learning unit and processing as the time series learning unit at the same time.

Specifically, the learning unit 13 learns the classification criterion of the classifier and the time series change of the classification criterion at the same time by using the labeled learning data to which collection time t=1 to T is given. In the present embodiment, logistic regression is applied to a model of the classifier on the assumption that an event that a label, which is the classifier, is given occurs in a predetermined probability distribution. Note that the model of the classifier is not limited to the logistic regression and may be a support vector machine, boosting, or the like.

Furthermore, in the present embodiment, a vector autoregressive (VAR) model is applied to the time series model representing the time series change of the classification criterion of the classifier. Note that the time series model is not limited to the VAR model and may be a model such as Gaussian Processes.

First, labeled learning data at time t is expressed by the following formula (1). Note that in the present embodiment, the label has two discrete values.

$$D_t := \{x_n^t, y_n^t\}_{n=1}^{N_t} \tag{1}$$

where $x_n^t$ is an d—dimensional feature vector of the n-th data, and $y_n^t \in \{0 \text{ and } 1\}$ is a label of the n-th data.

Furthermore, the entire labeled learning data at time t=1 to T is expressed by the following formula (2).

$$D = \{D_t\}_{t=1}^{T} \tag{2}$$

In this case, in the classifier to which the logistic regression is applied, a probability that a label $y_n^t$ of a feature vector $x_n^t$ is 1 is expressed by the following formula (3).

$$p(y_n^t = 1 | x_n^T, w_t) = \sigma(w_t^\tau x_n^t) = (1 + e^{-w_t^\tau x_n^t})^{-1} \tag{3}$$

where $w_t \in \mathbb{R}^d$ is a parameter of the classifier (d—dimensional vector), σ is a sigmoid function, and τ is transposition.

Furthermore, it is assumed that a parameter $w_t$ representing the classification criterion of the classifier to which an m-th order VAR model is applied depends linearly on past parameters $w_{t-1}$, and $w_{t-m}$. Therefore, a time series change of the parameter $w_t$, that is, dynamics can be expressed by the following expression (4).

$$w_t \sim N\left(w_t \left| \sum_{k=1}^{m} A_k w_{t-k} + A_0, \theta^{-1} I_d \right.\right) \tag{4}$$

where $N(\mu, \Sigma)$ is a normal distribution of an average μ and a covariance matrix Σ, $A_1, K, A_m \in \mathbb{R}^{d \times d}$ is a d—dimensional square matrix that determines dynamics, $A_0 \in \mathbb{R}^d$ is a bias clause, $I_d$ is a d-th unit matrix, and $\theta \in \mathbb{R}_+$ (positive real number) is a hyper parameter.

Note that in the case of t≤m, since the VAR model cannot be applied, it is assumed that the parameter $w_t$ follows a normal distribution $N(0, \theta_0^{-1} I_d)$ with an average of 0.

Furthermore, in the present embodiment, dynamics $A_1, \ldots,$ and $A_m$ are limited to diagonal matrices for simplicity. In this case, an i-th component of $w_t$, that is, $w_{t,i}$ (i=1 to d) depends only on past values $w_{t-1,i}, \ldots,$ and $w_{t-m,i}$.

Here, a probabilistic model of a joint distribution of a parameter W of the classifier and a parameter A of the time series model is defined by the following formula (5).

$$p(D, W, A, \Gamma, \theta, \theta_0) = \tag{5}$$

$$p(D \mid W) p(W \mid A, \theta, \theta_0) p(A \mid \Gamma) p(\Gamma) p(\theta) p(\theta_0) = \prod_{t=1}^{T} \prod_{n=1}^{N_t} p(y_n^t \mid x_n^t, w_t) \cdot$$

$$\prod_{t=1}^{m} N(w_t \mid 0, \theta_0^{-1} I_d) \times \prod_{t=m+1}^{T} N\left(w_t \mid \sum_{k=1}^{m} A_k w_{t-k} + A_0, \theta^{-1} I_d\right) \times$$

$$\prod_{k=0}^{m} N(A_k \mid 0, \gamma_k^{-1} I_d) \cdot Gam(\gamma_k \mid a_k, b_k) \times Gam(\theta \mid u, v) \cdot Gam(\theta_0 \mid u_0, v_0)$$

where D is labeled learning data,
W:={$w_1$, K, $w_t$} is a parameter of the classifier,
A:={$A_0$, K, $A_m$} is dynamics of the classifier and a bias parameter, and
$\Gamma$:={$\gamma_0$, K, $\gamma_m$}, $\theta$, $\theta_0$ is an accuracy parameter.
The dynamics and the bias parameters $A_k$ (k=0, K, m) are generated from the normal distribution N(0, $\gamma_k^{-1} I_d$). The accuracy parameter $\gamma_k$ (k=0, K, m) are generated from a gamma distribution Gam($a_k$, $b_k$). The accuracy parameter $\theta$ and $\theta_0$ are generated from gamma distributions Gam(u, v) and Gam($u_0$, $v_0$), respectively.

In the probabilistic model defined by the above formula (5), a probability distribution p (W, A, $\Gamma$, $\theta$, $\theta_0$|D) of parameters W, A, $\Gamma$, $\theta$, $\theta_0$ in a case where labeled learning data D is given is obtained. However, since it is difficult to directly obtain these probability distributions, in the present embodiment, an approximate distribution q (W, A, $\Gamma$, $\theta$, $\theta_0$|D) of the probability distribution p (W, A, $\Gamma$, $\theta$, $\theta_0$|D) is obtained by using a so-called variational Bayes method of approximately obtaining a posteriori probability.

First, to simplify a calculation, a logistic regression formula is approximated as illustrated in the right side of the following inequality (6).

$$p(y_n^t \mid x_n^t, w_t) \ge -e^{y_n^t a} \sigma(\xi_n^t) \left( \frac{a + \xi_n^t}{2} + h(\xi_n^t)\left(a^2 - \xi_n^{t2}\right) \right) \tag{6}$$

where a:=$w_t^T x_n^t$
$\xi_n^t \in \mathbb{R}$ is a parameter that determines the accuracy of approximation.

Next, it is assumed that the approximate distribution q (W, A, $\Gamma$, $\theta$, $\theta_0$|D) is expressed by the following formula (7).

$$q(W, A, \Gamma, \theta, \theta_0) = \prod_{t=1}^{T}\prod_{i=1}^{d} q(w_{t,i}) \prod_{k=0}^{m} q(A_k) q(\gamma_k) q(\theta) q(\theta_0) \tag{7}$$

In this case, using the variational Bayes method, it can be seen that the approximate distribution of the parameters W, A, $\Gamma$, $\theta$, $\theta_0$ has a functional form expressed by the following formulae (8).

$$\left. \begin{array}{l} q(w_{t,i}) = N(w_{t,i} \mid \eta_{t,i}, \lambda_{t,i}^{-1}), t = 1, K, T, i = 1, K, d \\ q(\alpha_k) = N(\alpha_k \mid \mu_k, S_k^{-1}), k = 0, K, m, \\ q(\gamma_k) = Gam(\gamma_k \mid a_k^\gamma, b_k^\gamma), k = 0, K, m, \\ q(\theta) = Gam(\theta \mid u^\theta, v^\theta) \\ q(\theta_0) = Gam(\theta_0 \mid u^{\theta_0}, v^{\theta_0}) \end{array} \right\} \tag{8}$$

where $\alpha_k$ is a d—dimensional vector that is created by extracting a diagonal component of $A_k$.

$\eta_{t,i} \in \mathbb{R}$
$\lambda_{t,i}, a_k^\gamma, b_k^\gamma, u^\theta, v^\theta, u^{\theta_0}, v^{\theta_0} \in \mathbb{R}$
$\mu_k \in \mathbb{R}^d$
$S_k \in \mathbb{R}^{d \times d}$ The learning unit 13 can obtain the approximate distributions of the parameters W, A, $\Gamma$, $\theta$, $\theta_0$ illustrated in the above formulae (8) by using an update formula illustrated in the following formulae (9) and repeating an update until a predetermined convergence condition is satisfied. Note that the predetermined convergence condition means, for example, that a predetermined number of update times is exceeded or that a change amount of a parameter becomes a certain value or less.

$$\left. \begin{array}{l} S_0 = \left( \frac{a_0^\gamma}{b_0^\gamma} + (T-m)\frac{u^\theta}{v^\theta} \right) I_d, \\ \mu_0 = S_0^{-1} \frac{u^\theta}{v^\theta} \sum_{t=1}^{T} \left( \eta_t - \sum_{k=1}^{m} dg(\mu_k)\eta_{t-k} \right), \\ S_k = \frac{a_k^\gamma}{b_k^\gamma} I_d + \frac{u^\theta}{v^\theta} \sum_{t=m+1}^{m} dg(\eta_{t-k})^2 + \Lambda_{t-k}^{-1}, \\ \mu_k = S_k^{-1} \frac{u^\theta}{v^\theta} \sum_{t=m+1}^{T} dg\left( \eta_t - \sum_{l \ne k} dg(\mu_l)\eta_{t-l} - \mu_0 \right) \eta_{t-k}, \\ a_k^\gamma = a_k + \frac{1}{2}d, b_k^\gamma = b_k + \frac{1}{2}\left( \|\mu_k\|^2 + Tr(S_k^{-1}) \right), k = 1, K, m, \\ u^\theta = u + \frac{1}{2}(T-m)d, \\ v^\theta = v + \frac{1}{2}\sum_{t=m+1}^{T} \{Tr(S_0^{-1} + \Lambda_t^{-1}) + \sum_{l=1}^{m}\eta_{t-1}^T S_t^{-1} \eta_{t-1} + \\ \left\| \eta_t - \sum_{l=1}^{m} dg(\mu_l)\eta_{t-1} - \mu_0 \right\|^2 + \sum_{l=1}^{m} Tr \\ (dg(\mu_l)^2 \Lambda_{t-1}^{-1}) + Tr(S_l^{-1} \Lambda_{t+1}^{-1})\}, \\ u^{\theta_0} = u_0 + \frac{1}{2}md, v^{\theta_0} = v_0 + \frac{1}{2}\sum_{t=1}^{T}\|\eta_t\|^2 + Tr(\Lambda_t^{-1}), \\ \Lambda_t = \frac{u^\theta}{v^\theta} \sum_{l=1}^{K_t^T}(dg(\mu_{m-t+1})^2 + S_{m-t+1}^{-1}) + \\ \frac{u^{\theta_0}}{v^{\theta_0}} I_d + 2\sum_{n=1}^{N_t} h(\xi_n^t) dg(x_n^t)^2, \end{array} \right\} \tag{9}$$

$$\left. \begin{array}{l} \eta_{t,i} = \lambda_{t,i}^{-1}\left( \frac{u^\theta}{v^\theta} \sum_{i=1}^{K_t^t}(\eta_{m+t,i} - \mu_{0,1})\mu_{m+1-t,i} - \frac{u^\theta}{v^\theta}\sum_{i=1}^{K_t^t}\sum_{l' \ne m+i-t}^{m} \\ \eta_{m+1-l',i} \cdot \mu_{l',i} \cdot \mu_{m+1-l',i} + \sum_{n=1}^{N_i} \\ \left\{ \left( y_n^t - \frac{1}{2} \right) x_{n,i}^t - 2h(\xi_n^t)\sum_{l \ne i} \eta_{t,l} x_{n,l}^t x_{n,i}^t \right\} \right), \\ t = 1, K, m, i = 1, K, d, \\ \Lambda_t = \frac{u^\theta}{v^\theta} \sum_{l=1}^{K_t^t}(dg(\mu_l)^2 + S_l^{-1}) + \frac{u^\theta}{v^\theta} I_d + 2\sum_{n=1}^{N_t} h(\xi_n^t) dg(x_n^t)^2, \\ \eta_{t,i} = \lambda_{t,i}^{-1}\left( \frac{u^\theta}{v^\theta} \sum_{l=1}^{m} \mu_{l,i}\eta_{t-1,i} + \frac{u^\theta}{v^\theta}\sum_{i=1}^{K_t^t}(\eta_{t+l,i} - \mu_{0,1})\mu_{l,i} - \right. \\ \frac{u^\theta}{v^\theta}\sum_{i=1}^{K_t^t}\sum_{l' \ne 1}^{m} \eta_{t+l-l',i} \cdot \mu_{l',i} \cdot \mu_{l,i} + \frac{u^\theta}{v^\theta}\mu_{0,1} + \sum_{n=1}^{N_i} \left\{ \left( y_n^t - \frac{1}{2} \right) x_{n,i}^t - \right. \\ \left. 2h(\xi_n^t)\sum_{l \ne i} \eta_{t,l} x_{n,l}^t x_{n,i}^t \right\} \right), \\ t = m+1, K, T, i = 1, K, d, \\ (\xi_n^t)^2 = x_n^{t T}(\Lambda_t^{-1} + \eta_t \eta_t^T) x_n^t, \\ t = 1, K, T, n = 1, K, N_t, \end{array} \right\} \tag{9}$$

where dg(x) is a diagonal matrix with a diagonal component being $x \in \mathbb{R}^d$ $\| \ \|$ is an Euclidean norm, and Tr is trace.

$\mu_t := (\mu_{t,1}, K, \mu_{t,d})$
$\eta_t := (\eta_{t,1}, K, \eta_{t,d})$
$\Lambda_t := dg(\lambda_{t,1}, K, \lambda_{t,d})$
$K_1^t := \min(t, T-m)$
$K_2^t := \min(m, T-t)$ The classifier creating unit 14 functions as a predicting unit that predicts a classification criterion of a future classifier. Specifically, the classifier creating unit 14 creates classifiers at future time t=T+1, T+2, . . . by using the time series model obtained by the learning unit 13. For example, in a case where the logistic regression is applied to the model of the classifier as described above and the VAR model is applied to the time series model representing the time series change of the classification criterion of the classifier, the parameters W and A learned by the above formulae (9) are applied to the above expression (4), and as a result parameters $w_{T+1}, w_{T+2}, \ldots$ of the future classifier are obtained sequentially. As a result, the classifier creating unit 14 can create a classifier having a predicted classification criterion at the future time. The classifier creating unit 14 stores the created classifier in the classifier storing unit 15.

The classifier storing unit 15 is achieved by a semiconductor memory device such as a random access memory (RAM) and a flash memory or a storage device such as a hard disk and an optical disk and stores the created classifier at the future time. A storage format is not particularly limited, and examples thereof include a database format such as MySQL and PostgreSQL, a table format, and a text format.

[Classifying Unit]

The classifying unit 20 includes a data inputting unit 21, a data converting unit 22, a classifying unit 23, and a classification result outputting unit 24. As described above, the classifying unit 20 performs the classification processing of classifying data by using the classifier created by the creating unit 10 and outputting a label.

The data inputting unit 21 is achieved by using an input device such as a keyboard and a mouse and inputs various instruction information to the control unit in response to an input operation by an operator and receives data to be subject to the classification processing. The data to be subject to the classification processing that is received here is given time information at a certain time point. The data inputting unit 21 may be the same hardware as that of the learning data inputting unit 11.

The control unit is achieved by using the CPU or the like that executes the processing program, and the control unit includes the data converting unit 22 and the classifying unit 23.

As with the data converting unit 12 of the creating unit 10, the data converting unit 22 converts the data to be subject to the classification processing that is received by the data inputting unit 21 into a combination of the collection time and the feature vector. Here, since the data to be subject to the classification processing is given the time information at the certain time point, the collection time and the time information are the same.

The classifying unit 23 refers to the classifier storing unit 15 and performs the classification processing of the data by using the classifier at the same time as the collection time of the data to be subject to the classification processing. For example, in a case where the logistic regression is applied to the model of the classifier as described above and the VAR model is applied to the time series model representing the time series change of the classification criterion of the classifier, a probability that a label of the data is 1 is obtained according to the above formula (3). The classifying unit 23 sets the label=1 when the obtained probability is equal to or larger than a predetermined threshold value set in advance and sets the label=0 in a case where the obtained probability is smaller than the threshold value.

The classification result outputting unit 24 is achieved with a display device such as a liquid crystal display, a printing device such as a printer, an information communication device, and the like, and outputs a result of the classification processing to the operator. For example, the classification result outputting unit 24 outputs a label for input data or gives a label to the input data and outputs the input data given the label.

[Creating Processing]

Figure 2:
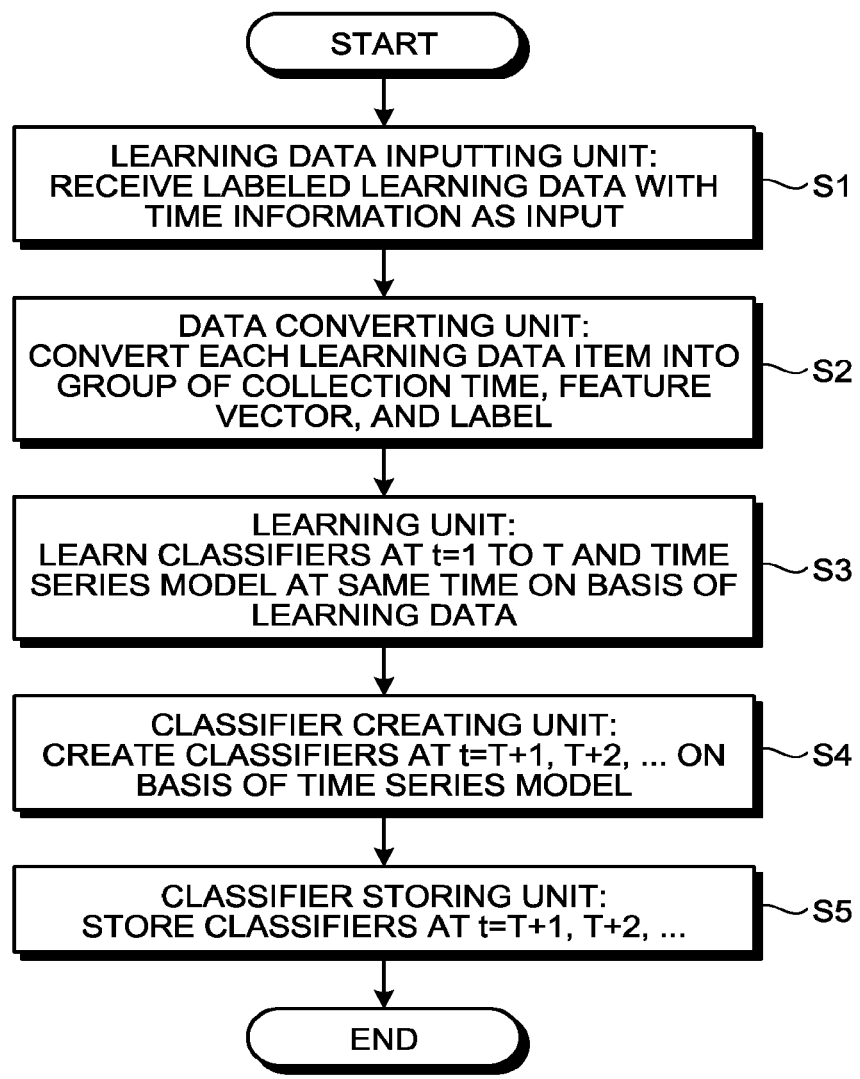
FIG. 2 is a flowchart illustrating a creation processing procedure according to the first embodiment.

Next, the creation processing by the creating unit 10 of the creating apparatus 1 will be described with reference to FIG. 2. The flowchart in FIG. 2 is started, for example, at timing when a user performs an operation input to instruct the start of the creation processing.

First, the learning data inputting unit 11 receives labeled learning data to which the time information is given (Step S1). Next, the data converting unit 12 converts the received labeled learning data into data of a combination of the collection time, the feature vector, and a numerical label (Step S2).

Next, the learning unit 13 learns the classification criteria of the classifiers at the time t=1 to T and the time series model illustrating the time series change of the classification criterion by using the labeled learning data after the conversion by the data converting unit 12 (Step S3). For example, parameters W ($w_t=w_1$ to $w_T$) of a logistic regression model and parameters A ($=A_0$ to $A_m$) of the VAR model can be obtained at the same time.

Next, the classifier creating unit 14 predicts classification criteria of classifiers at the future time t=T+1, T+2, . . . by using the time series model and creates a classifier (Step S4). For example, regarding the classifier to which the logistic regression and the VAR model are applied, parameters of future classifiers $w_{T+1}, w_{T+2}, \ldots$ are obtained.

Finally, classifiers at the future time t=T+1, T+2, . . . created by the classifier creating unit 14 are stored in the classifier storing unit 15 (Step S5).

[Classification Processing]

Figure 3:
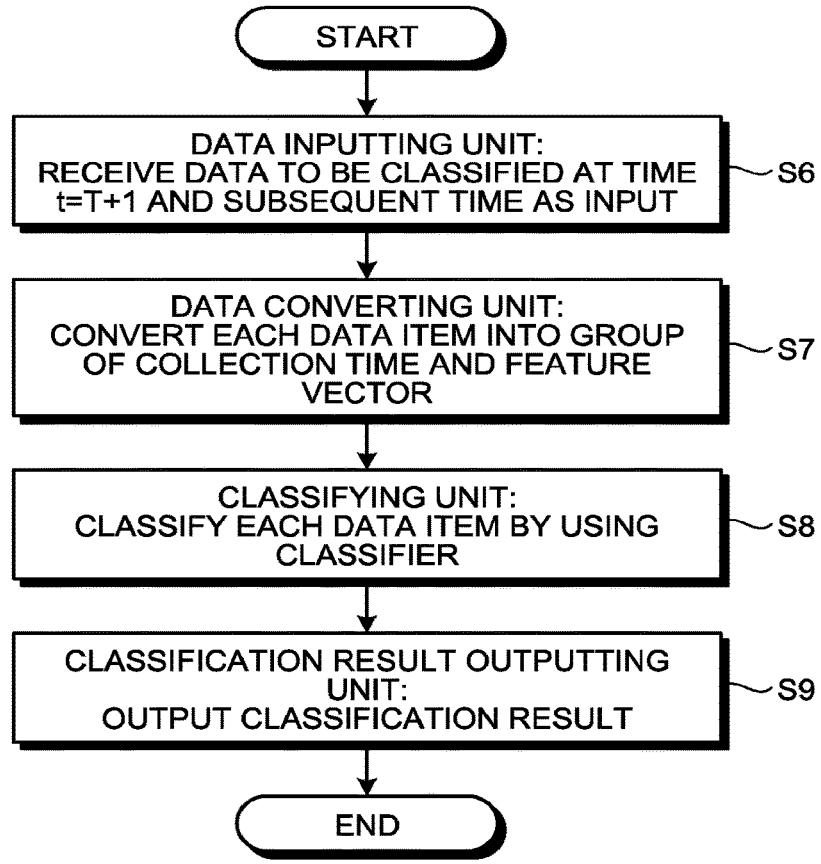
FIG. 3 is a flowchart illustrating a classification processing procedure according to the first embodiment.

Next, the classification processing by the classifying unit 20 of the creating apparatus 1 will be described with reference to FIG. 3. The flowchart of FIG. 3 is started, for example, at timing when the user performs an operation input to instruct the start of the classification processing.

First, the data inputting unit 21 receives the data to be subject to the classification processing at the time t=T+1 and subsequent time (Step S6), and the data converting unit 22 converts the received data into data of a combination of the collection time and the feature vector (Step S7).

Next, the classifying unit 23 refers to the classifier storing unit 15 and performs the classification processing of the data by using the classifier at the collection time of the received data (Step S8). Then, the classification result outputting unit 24 outputs the classification result, that is, outputs the label of the classified data (Step S9).

Figure 4:
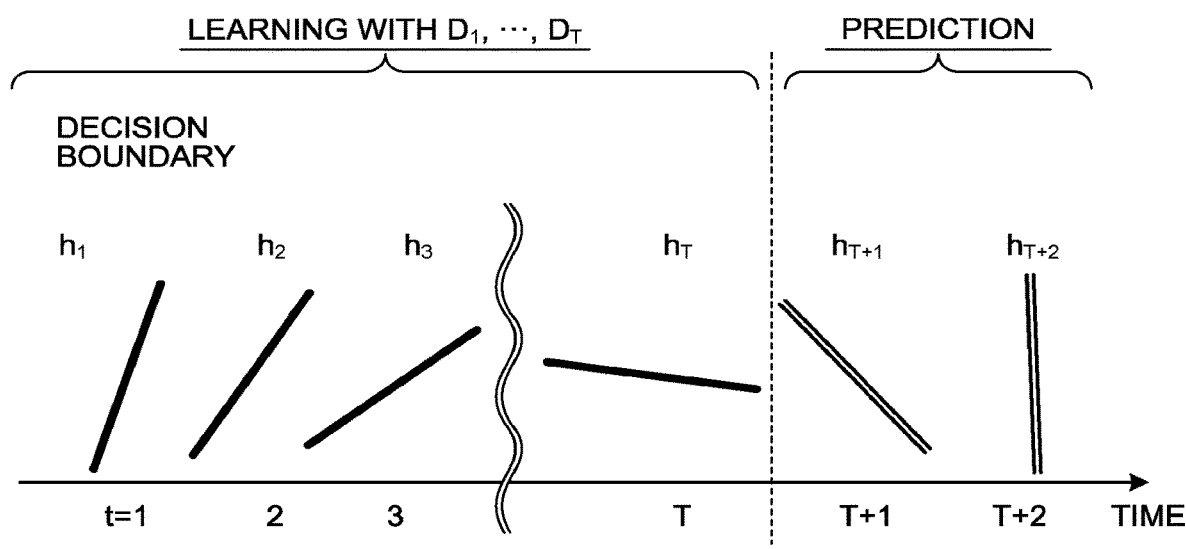
FIG. 4 is a descriptive diagram for describing an effect of creation processing by the creating apparatus according to the first embodiment.

As described above, in the creating apparatus 1 of the present embodiment, the learning unit 13 learns the classification criterion of the classifier at each time point in the past until the present and the time series change of the classification criterion, and the classifier creating unit 14 predicts the classification criterion of the future classifier by using the learned classification criterion and time series change. That is, as exemplified in FIG. 4, the learning unit 13 learns the classification criteria of classifiers $h_t$ ($h_1$, $h_2$, $h_3$, ..., and $h_T$) at the time t=1 to T and the time series model representing the time series change of the classification criterion, that is, dynamics by using input labeled learning data $D_t$ ($D_1$, ..., and $D_T$) at the collection time t=1 to T until the present. Then, the classifier creating unit 14 predicts the classification criteria at the future time t=T+1, T+2, ... and creates classifiers $h_{T+1}$, $h_{T+2}$, ... at each point of the time.

As a result, according to the creation processing of the creating unit 10 in the creating apparatus 1 of the present embodiment, it is possible to suppress the deterioration of the classification accuracy of the classifier without using the latest labeled learning data. In other words, it is possible to prevent a decrease in classification accuracy without frequently adding the latest labeled learning data and updating the classifier. In this way, it is possible to create a classifier whose classification accuracy is maintained without frequently collecting labeled learning data.

For example, in a case where a security vendor regularly distributes an updated file of antivirus software, that is, an updated classifier, the classifier can respond to viruses that change until the next distribution and classify data accurately. Furthermore, if the classifier at future time is built into the antivirus software, the classifier at the future time can respond to changing viruses even in a case where the classifier at future time is used in an offline environment.

Furthermore, in particular, in a case where the classification criterion of the classifier and the time series change of the classification criterion are learned at the same time, for example, even in a case where the number of pieces of labeled learning data is small, stable learning can be performed as compared with a case where the classification criterion of the classifier and the time series change of the classification criterion are learned separately.

Note that the creation processing according to the present invention is not limited to a classification problem with labels as discrete values and may be a regression problem with labels as real values. As a result, future classification criteria of various classifiers can be predicted.

In the above embodiment, the learning unit 13 learns the classification criterion of the classifier and the time series change of the classification criterion by using the labeled learning data at the past collection time t=1 to T in the time creation processing at a time. However, the embodiment is not limited to this. For example, the learning unit 13 may learn the classification criterion of the classifier and the time series change of the classification criterion by using labeled learning data at the collection time t=1 to T−1, and thereafter learn the classification criterion of the classifier and the time series change of the classification criterion by using the latest labeled learning data at the collection time T. In that case, a future classifier is created by using each learned classification criterion of the classifier and the time series change of the classification criterion. As a result, it is possible to create a classifier that accurately reflects a feature of the latest labeled learning data at the collection time T.

Furthermore, it is not necessary that the labeled learning data is continuous at some of the past collection time t=1 to T, that is, at fixed discrete time intervals. For example, in a case where Gaussian Processes is applied to the time series model representing the time series change of the classification criterion of the classifier, the classifier can be created even if the discrete time intervals are nonuniform.

Second Embodiment

Figure 5:
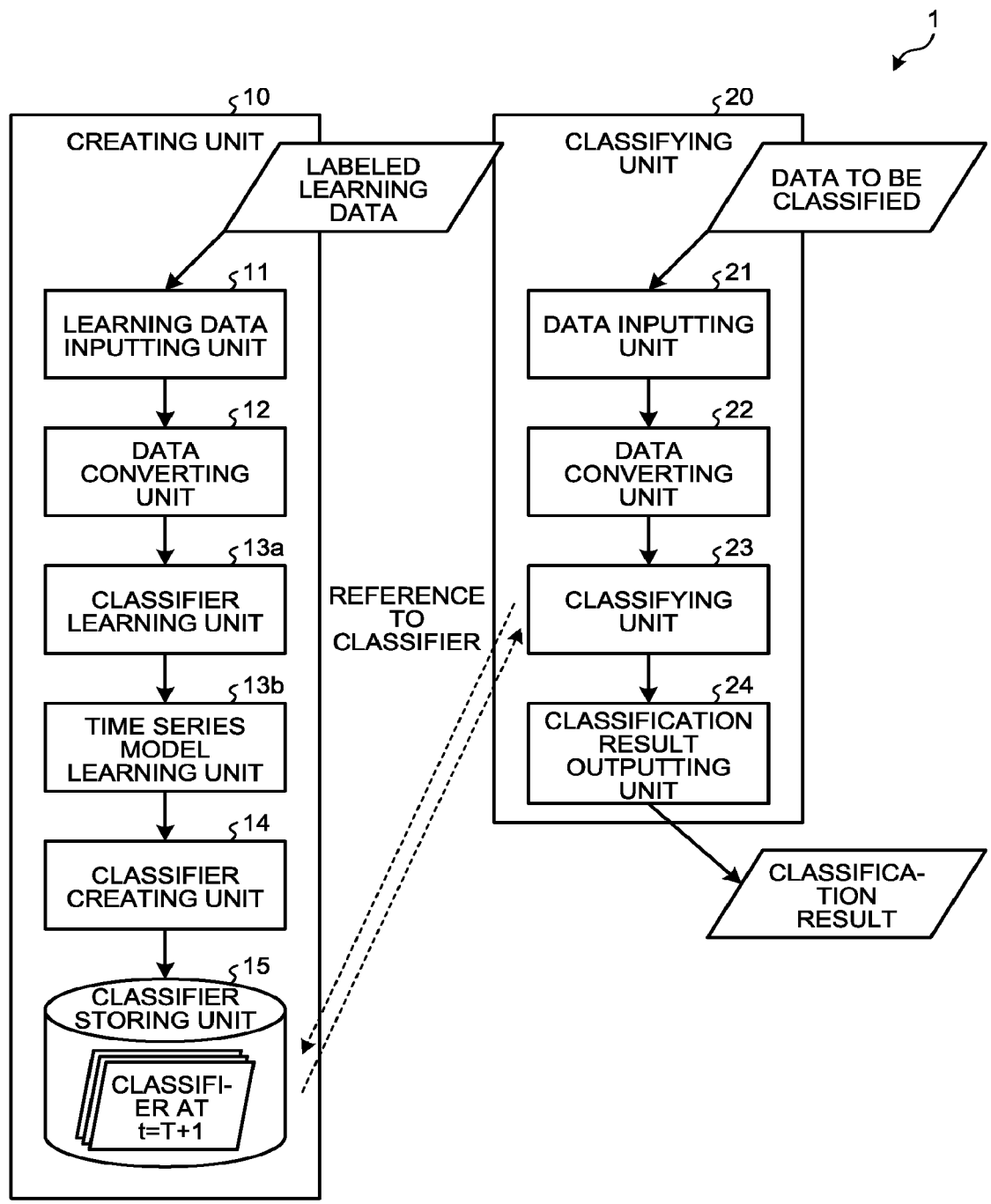
FIG. 5 is a schematic diagram illustrating a schematic configuration of a creating apparatus according to a second embodiment.

The learning unit 13 of the first embodiment described above may be separated into a classifier learning unit 13a and a time series model learning unit 13b. FIG. 5 is a diagram exemplifying a schematic configuration of a creating apparatus 1 according to a second embodiment. The present embodiment is different only in that a classifier learning unit 13a and a time series model learning unit 13b perform, in a sharing manner, the processing by the learning unit 13 of the first embodiment described above. Since other processing is the same as that in the first embodiment, the description thereof will be omitted.

Note that in the present embodiment, as in the first embodiment, logistic regression is applied to a model of a classifier, and a VAR model is applied to a time series model representing a time series change of a classification criterion of the classifier.

The classifier learning unit 13a learns the classification criterion of the classifier at each time point in the past until the present. Specifically, a parameter $w_t$ of the classifier, which is an input to a VAR model, is obtained as a point that maximizes a log posterior distribution illustrated in the following formula (10) by using a maximum a posteriori (MAP) estimation.

$$\log p(w_t|X_t, Y_t, w_{t-1}, \theta)$$

$$= \log p(Y_t|w_t, X_t) + \log(w_t|w_{t-1}, \theta) \quad (10)$$

where $X_t = \{x_n^r\}_{n=1}^{N_t}$
$Y_t = \{y_n^r\}_{n=1}^{N_t}$
$p(w_t|w_{t-1}, \theta) = N(w_{t-1}, \theta^{-1}I_d)$ Regarding the parameters $w_1$ to $w_T$, the classifier learning unit 13a executes the above MAP estimation in order of the parameters $w_1$ to $w_T$. As a result, the classifier learning unit 13a can obtain classifiers at the time t=1 to T.

The time series model learning unit 13b functions as a time series change learning unit that learns the time series change of the classification criterion. In the present embodiment, the time series model learning unit 13b performs time series change learning processing after classifier learning processing by the classifier learning unit 13a.

Specifically, when the classifiers at the time t=1 to T obtained by the classifier learning unit 13a are used, a probabilistic model of a joint distribution of a parameter W of the classifier and a parameter A of the time series model is expressed by the following formula (11).

$$p(W, A, \Gamma, \theta) = \\ p(w|A, \theta)p(A|\Gamma)p(\Gamma)p(\theta) = \prod_{t=m+1}^{T} N\left(w_t \middle| \sum_{k=1}^{m} A_k W_{t-k} + A_0, \theta^{-1}I_d\right) \times \\ \prod_{k=0}^{m} N(A_k | 0, \gamma_k^{-1}I_d) \cdot Gam(\gamma_k | a_k, b_k) \cdot Gam(\theta | u, v) \quad (11)$$

Here, as in the first embodiment described above, it can be seen that when a variational Bayes method is used, approximate distributions of parameters A, Γ, and θ have functional forms illustrated in the following formulae (12).

$$\left.\begin{array}{l} q(\alpha_k) = N(\alpha_k \mid \mu_k, S_k^{-1}), k = 0, K, m, \\ q(\gamma_k) = Gam(\gamma_k \mid a_k^\gamma, b_k^\gamma), k = 0, K, m, \\ q(\theta) = Gam(\theta \mid u^\theta, v^\theta) \end{array}\right\} \quad (12)$$

As in the first embodiment, the time series model learning unit 13b can obtain the approximate distributions of the parameters A, Γ, and θ illustrated in the above formulae (12) by using an updating formula illustrated in the following formulae (13) and repeating an update until a predetermined convergence condition is satisfied.

$$\left.\begin{array}{l} S_0 = \left(\frac{a_0^\gamma}{b_0^\gamma} + (T-m)\frac{u^\theta}{v^\theta}\right)I_d \\ \mu_0 = S_0^{-1}\frac{u^\theta}{v^\theta}\sum_{t=m+1}^{T}\left(w_t - \sum_{k=1}^{m}dg(\mu_k)w_{t-k}\right) \\ S_k = \frac{a_k^\gamma}{b_k^\gamma}I_d + \frac{u^\theta}{v^\theta}\sum_{t=m+1}^{T}dg(w_{t-k})^2 \\ \mu_k = S_k^{-1}\frac{u^\theta}{v^\theta}\sum_{t=m+1}^{T}dg\left(w_t - \sum_{l\neq k}dg(\mu_l)w_{t-l} - \mu_0\right)w_{t-k} \\ a_k^\gamma = a_k + \frac{1}{2}d,\; b_k^\gamma = b_k + \frac{1}{2}(\|\mu_k\|^2 + Tr(S_k^{-1})) \\ \qquad k = 1, K, m \\ u^\theta = u + \frac{1}{2}(T-m)d. \\ v^\theta = v + \frac{1}{2}\sum_{t=m+1}^{T}\left(\left\|w_t - \sum_{l=1}^{m}dg(\mu_l)w_{t-1} - \mu_0\right\|^2 + \right. \\ \left. Tr(S_0^{-1}) + \sum_{l=1}^{m}w_{t-l}^T S_l^{-1} w_{t-l}\right) \end{array}\right\} \quad (13)$$

Figure 6:
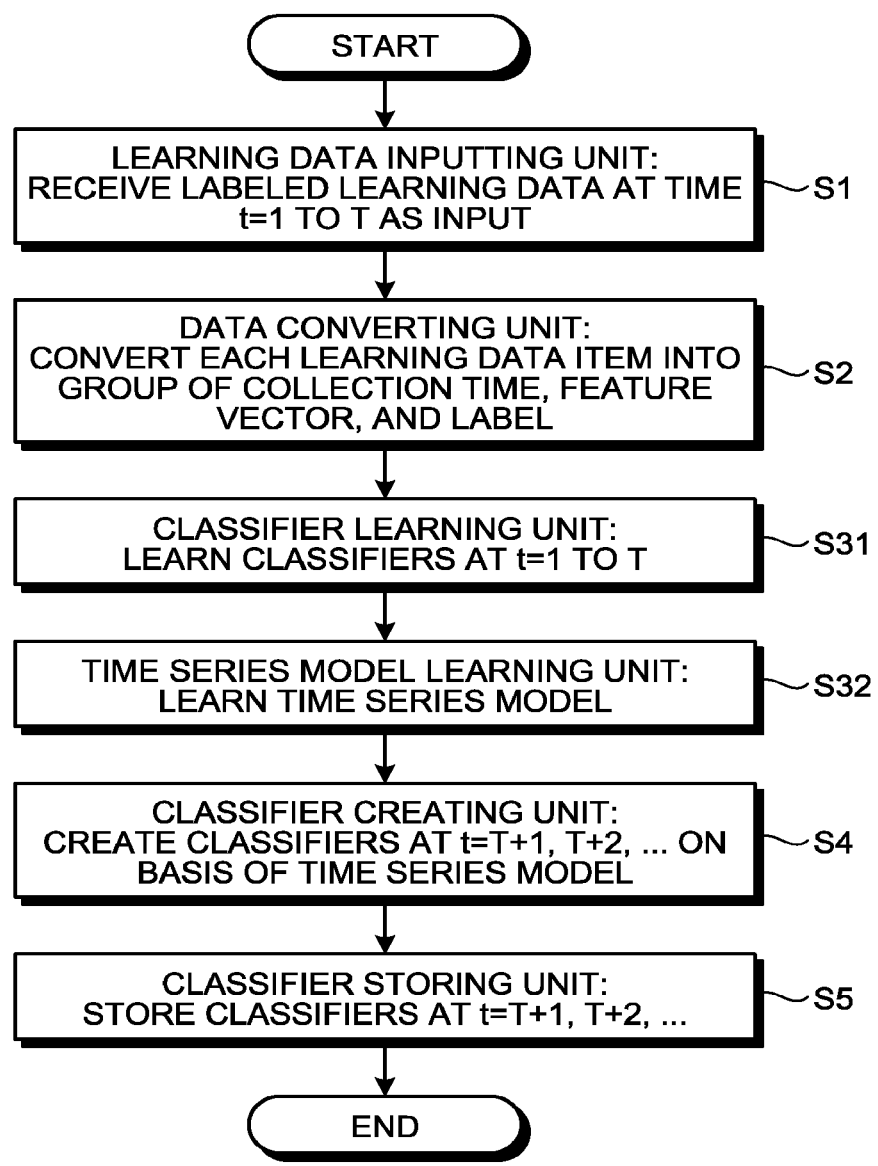
FIG. 6 is a flowchart illustrating a creation processing procedure according to the second embodiment.

Next, creation processing by a creating unit 10 of the creating apparatus 1 of the present embodiment will be described with reference to FIG. 6. The only differences from the first embodiment described above only are processing of Step S31 and the processing of Step S32.

In the processing of Step S31, the classifier learning unit 13a learns the classification criteria of the classifiers at the time t=1 to T by using the labeled learning data at collection time t=1 to T. For example, the parameters W ($w_t$=$w_1$ to $w_T$) of the logistic regression model are obtained.

In the processing of Step S32, the time series model learning unit 13b learns the time series model representing the time series change of the classification criterion by using the classification criteria of the classifiers at the time t=1 to T obtained by the classifier learning unit 13a. For example, the parameters A (=$A_0$ to $A_m$) of the VAR model are obtained.

In this way, according to the creation processing of the creating unit 10 of the creating apparatus 1 of the present embodiment, the classification criterion of the classifier and the time series change of the classification criterion are learned separately. As a result, for example, even in a case where the number of pieces of labeled learning data is large, the processing load on each functional unit can be made smaller than in a case where the classification criterion of the classifier and the time series change of the classification criterion are learned at the same time.

Third Embodiment

Figure 7:
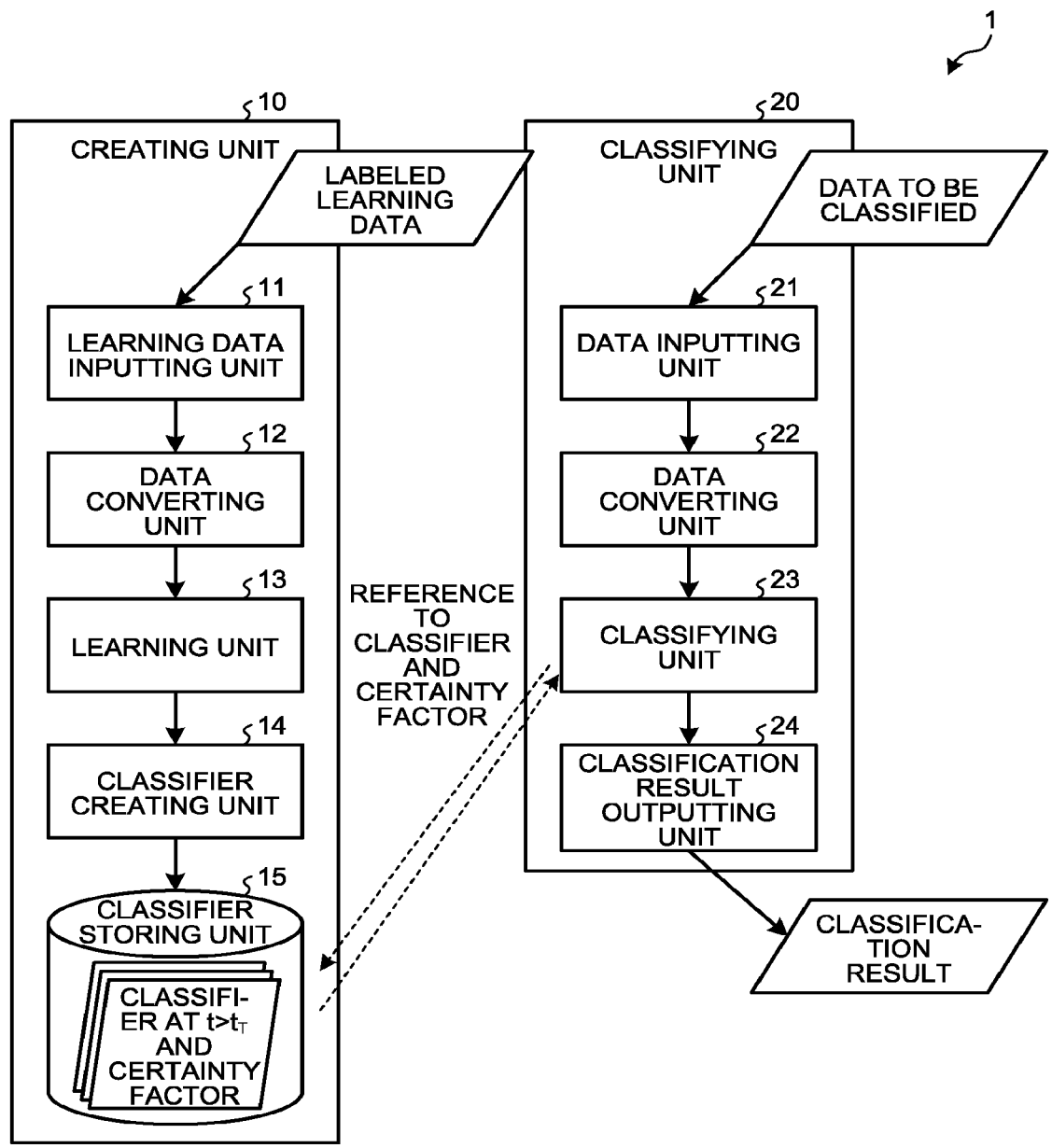
FIG. 7 is a schematic diagram illustrating a schematic configuration of a creating apparatus according to a third embodiment.

The classifier creating unit 14 of the first embodiment or the second embodiment described above may further derive a certainty factor of the prediction of the classification criterion of the classifier. FIG. 7 is a diagram exemplifying a schematic configuration of a creating apparatus 1 according to a third embodiment. In the present embodiment, logistic regression is applied to a model of a classifier, and Gaussian Processes is applied to a time series model representing a time series change of a classification criterion of the classifier. Only processing different from that in the first embodiment described above will be described below. Note that the description of the same processing as that in the first embodiment will be omitted.

Specifically, a learning unit 13 learns the classification criterion of the classifier and the time series change of the classification criterion at the same time by using labeled learning data to which collection time t until $t_T$ is given. Note that in the following description, $t_1 < t_2 < \ldots$, and $< t_T$ is assumed. In the present embodiment, logistic regression is applied to a model of the classifier on the assumption that an event that a label, which is the classifier, is given occurs in a predetermined probability distribution. Note that the model of the classifier is not limited to the logistic regression and may be a support vector machine, boosting, or the like.

Furthermore, in the present embodiment, Gaussian Processes is applied to the time series model representing the time series change of the classification criterion of the classifier. Note that the time series model is not limited to Gaussian Processes and may be a model such as a VAR model.

First, labeled learning data at time t is expressed by the following formula (14). Note that in the present embodiment, the label has two discrete values, but a case where there are three or more labels is also applicable.

$$D_t := \{x_n^t, y_n^t\}_{n=1}^{N_t} \quad (14)$$

where $x_n^t$ is a D—dimensional feature vector of the n-th data, and $y_n^T \in \{0,1\}$ is a label of the n-th data.

Furthermore, the entire labeled learning data at the time t=$t_1$ to $t_T$ is expressed by the following formula (15).

$$D = \{D_t\}_{t=t_1}^{t_T} \quad (15)$$

In this case, in the classifier to which the logistic regression is applied, a probability that a label $y_n^t$ of a feature vector $x_n^t$ is 1 is expressed by the following formula (16).

$$p(y_n^T=1|x_n^t,w_t)=\sigma(w_n^\tau x_n^t)=(1+e^{-w_n^\tau x_n^t})^{-1} \quad (16)$$

where $w_t \in R^D$ is a parameter of the classifier (D—dimensional vector),

σ is a sigmoid function, and

τ is transposition.

A d component $w_{td}$ of a parameter of the classifier at time t is assumed to be written by using a nonlinear function $f_d$ according to the following formula (17). Here, d=1 to D.

$$w_{td}=f_d(t)+\varepsilon_d \quad (17)$$

where $f_d$ is a nonlinear function that takes time t as an input, and $\varepsilon_d$ is Gaussian noise.

Furthermore, a prior distribution of the nonlinear function $f_d$ conforms to Gaussian Processes. That is, it is assumed that a value of the nonlinear function at each time point of the time t=$t_1$ to $t_T$ illustrated in the following formula (18) is generated from a Gaussian distribution expressed by the following formula (19).

$$f_d=(f_d(t_1),K,f_d(t_T)) \quad (18)$$

$$p(f_d)=N(f_d|0,K_d) \quad (19)$$

where $N(\mu, \Sigma)$ is a Gaussian distribution of an average $\mu$ and a covariance matrix $\Sigma$, and $K_d$ is a covariance matrix that takes a kernel function $K_d$ as a component.

Here, each component of a covariance matrix is expressed by the following formula (20).

$$[K_d]_{tt'} := K_d(t,t') \tag{20}$$

$k_d$ described above can be defined by an arbitrary kernel function, but in the present embodiment, it is defined by a kernel function illustrated in the following formula (21).

$$K_d(t,t') = \beta_d^2 \exp(-\tfrac{1}{2}\alpha_d^2 |t-t'|^2) + \gamma_d^2 \tag{21}$$

where $\alpha_d$, $\beta_d$, $\gamma_d$ is a parameter that characterizes dynamics (real number).

In this case, a probability distribution of the parameter (d component) of the classifier at the time $t=t_1$ to $t_T$ illustrated in the following formula (22) is expressed by the following formula (23).

$$w_{\cdot d} := (w_{t_1 d}, K, w_{t_T d}) \in R^T \tag{22}$$

$$p(w_{\cdot d}) = \int p(w_{\cdot d}|f_d) p(f_d) df_d = N(w_{\cdot d}|0, C_d) \tag{23}$$

where $C_d$ is a covariance matrix in which each component is defined by a kernel function $c_d$.

A component of this covariance matrix is defined by a kernel function $c_d$ illustrated in the following formula (24).

$$C_d(t,t') := k_d(t,t') + \delta_{tt'} \eta_d^2 \tag{24}$$

where $\eta_d$ is a parameter (real number), and $\delta_{tt'}$ is a function that returns 1 when $t=t'$ is satisfied and returns 0 when $t=t'$ is not satisfied.

In this case, a joint distribution model of a joint distribution for learning a classification criterion W of the classifier illustrated in the following formula (25) and a parameter $\theta$ illustrated in the following formula (26) representing the time series change (dynamics) of the classification criterion is defined by the following formula (27).

$$W := (w_{t_1}, K, w_{t_T}) \tag{25}$$

$$\theta := (\alpha_1, K, \alpha_D, \beta_1, K, \beta_D, \gamma_1, K, \gamma_D, \eta_1, K, \eta_D) \tag{26}$$

$$p(D, W; \theta) = p(D|w) p(W; \theta) = \prod_{t=t_1}^{t_T} \prod_{n=1}^{N_t} p(y_n^t | x_n^t, w_t) \cdot \prod_{d=1}^{D} N(w_{\cdot d} | 0, C_d) \tag{27}$$

Next, a probability that a classifier W is obtained in a case where the labeled learning data is given and a dynamics parameter $\theta$ are estimated by using a so-called empirical Bayes method of empirically giving a prior probability from data, on the basis of the probabilistic model defined by formula (27) described above. In the empirical Bayes method, a lower limit L illustrated in the following formula (28) is maximized. As a result, a desired distribution of W, that is, q (W) and the dynamics parameter $\theta$ can be obtained.

$$L(q; \theta) = \int q(W) \log \frac{p(D, W; \theta)}{q(W)} dW \tag{28}$$

where q(W) is an approximate distribution of a probability p(W|D) that the classifier W is obtained when a labeled learning data D is given.

Here, it is assumed that q (W) can be factorized as illustrated in the following formula (29).

$$q(W) = \prod_{t=t_1}^{t_T} \prod_{n=1}^{N_t} q(w_{td}). \tag{29}$$

In that case, it can be seen that q (W) shows a functional form of a Gaussian distribution expressed by the following formula (30).

$$q(w_{td}) = N(w_{td} | \mu_{td}, \lambda_{td}^{-1}) \tag{30}$$

Here, $\mu_{td}$ and $\lambda_{td}$ are estimated by using an update formula illustrated in the following formulae (31).

$$\mu_{td} = \lambda_{td}^{-1} \left( \sum_{n=1}^{N_t} \left\{ \left( y_n^t - \frac{1}{2} \right) x_{nd}^t - 2h(\xi_n^t) \sum_{l \neq d} \mu_{tl} x_{nl}^t x_{nd}^t \right\} - \sum_{s \neq t} [C_d^{-1}]_{ts} \mu_{sd} \right) \tag{31}$$

$$\lambda_{td} = [C_d^{-1}]_{tt} + 2 \sum_{n=1}^{N_t} h(\xi_n^t)(x_{nd}^t)^2$$

$$(\xi_n^t)^2 = x_n^{t\,T} (\Lambda_t^{-1} + \mu_t \mu_t^T) x_n^t$$

where $h(\xi_n^t) := \dfrac{1}{2\xi_n^t} \left( \sigma(\xi_n^t) - \dfrac{1}{2} \right)$, $\mu_t := (\mu_{t1}, K, \mu_{tD})$, $\Lambda_t := \mathrm{diag}(\lambda_{t1}, K, \lambda_{tD})$ $\xi_n^t$ is an approximate parameter corresponding to each data, and $\sigma$ is a sigmoid function.

Furthermore, the dynamics parameter $\theta$ is updated by using a so-called quasi-Newton method for solving a non-simultaneous formula. In the quasi-Newton method, a term relating to $\theta$ of the lower limit L and differential with respect to $\theta$ illustrated in the following formulae (32) are used.

$$L(q; \theta, \xi) = -\frac{1}{2} \sum_{d=1}^{D} \left[ \mu_{\cdot d}^T C_d^{-1} \mu_{\cdot d} + Tr(C_d^{-1} \Lambda_d^{-1}) + \log(\det(C_d)) \right] + const \tag{32}$$

$$\frac{\partial L(q; \theta, \xi)}{\partial \theta_d} = \frac{1}{2} \mu_{\cdot d}^T C_d^{-1} \frac{\partial C_d}{\partial \theta_d} C_d^{-1} \mu_{\cdot d} + \frac{1}{2} Tr \left( C_d^{-1} \frac{\partial C_d}{\partial \theta_d} (C_d^{-1} \Lambda_d^{-1} - I) \right)$$

where $\mu_d := (\mu_{t_1 d}, K, \mu_{t_T d})$, $\Lambda_d := \mathrm{diag}(\lambda_{t_1 d}, K, \lambda_{t_T d})$, and I is a unit matrix.

The learning unit 13 can estimate a desired parameter by alternately repeating the update of q (W) and the update of $\theta$ until a predetermined convergence condition is satisfied by using the above update formula. The predetermined convergence condition means, for example, exceeding a predetermined number of update times, or a change amount of a parameter becomes equal to or less than a certain value, and the like.

Note that when the update is repeated, the magnitude of the parameter $w_{\cdot d}$ related to a feature that does not affect the classification approaches zero. In this way, in a case where Gaussian Processes is used, features that are not important are automatically excluded.

By using the classification criterion of the classifier and the time series change of the classification criterion learned by the learning unit 13, the classifier creating unit 14 derives a prediction of the classification criterion of the classifier at future time $t_* > t_T$ and a probability of the prediction, that is, a certainty factor of the prediction. A probability distribution that the classifier W is obtained at time $t_* > t_T$ is expressed by the following formulae (33).

$$\left. \begin{array}{l} p(w_{t_*}) = \prod_{d=1}^{D} p(w_{t_*d}) \\ p(w_{t_*d}) = \int p(w_{t_*d} \mid w_{,d}) q(w_{,d}) dw_{,d} = N(w_{t_*d} \mid m_{t_*d}, \sigma_{t_*d}^2) \\ m_{t_*d} = k_d^T C_d^{-1} \mu_{,d} \\ \sigma_{t_*d}^2 = k_d(t_*, t_*) + \eta_d^2 + k_d^T (C_d^{-1} \Lambda_d^{-1} - I) C_d^{-1} k_d \end{array} \right\} \quad (33)$$

where $k_d := (k_d(t_*, t_1), K, k_d(t_*, t_T))$, $m_{t*d}$ is a classifier parameter (d component), and an inverse number of $\sigma_{t*d}^2$ is a certainty factor of the classifier parameter (d component).

As a result, the classifier creating unit 14 can obtain the classifier having the predicted classification criterion at the future time together with the certainty factor of the prediction. The classifier creating unit 14 stores the predicted classifier and the certainty factor in a classifier storing unit 15.

The classifying unit 23 refers to the classifier storing unit 15 and performs classification processing of data by using the classifier at the same time as the collection time of data to be subject to the classification processing and the certainty factor. For example, in a case where the logistic regression is applied to the model of the classifier as described above and Gaussian Processes is applied to a time series model representing the time series change of the classification criterion of the classifier, a probability that a label y of the data x is 1 is obtained by the following formulae (34). The classifying unit 23 sets the label=1 when the obtained probability is equal to or larger than a predetermined threshold value set in advance and sets the label=0 in a case where the obtained probability is smaller than the threshold value.

$$\left. \begin{array}{l} p(y_n^{t_*} = 1 \mid x_n^{t_*}) = \sigma(\tau(\tilde{\sigma}^2)\tilde{\mu}), \\ \tilde{\mu} = m_{t_*}^T x_n^{t_*}, \tilde{\sigma}^2 = x_n^{t_*T} \sum_{t_*} x_n^{t_*}, \\ \tau(z) = (1 + \pi z/8)^{-\frac{1}{2}}, \end{array} \right\} \quad (34)$$

wherein $m_{t*} := (m_{t*1}, K, m_{t*D})$, $\Sigma_{t*}$ is a diagonal matrix whose diagonal elements are $\sigma_{t*1}^2, K, \sigma_{t*D}^2$).

Figure 8:
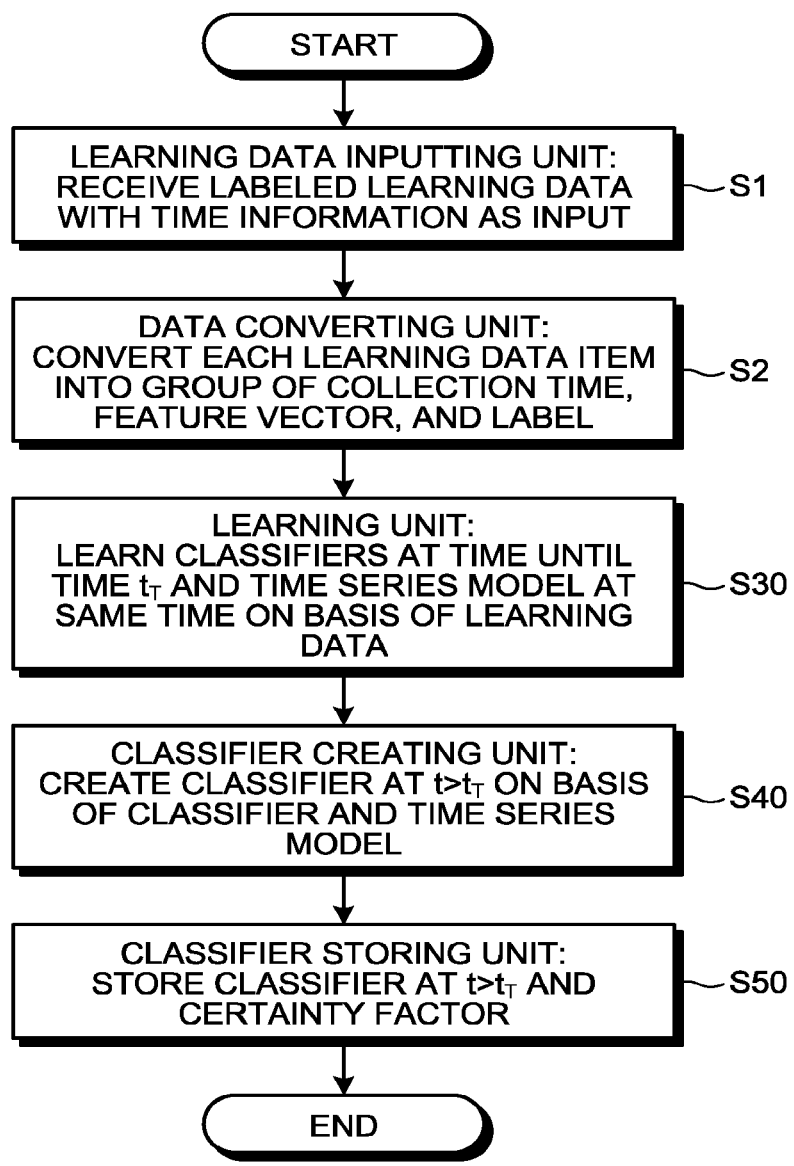
FIG. 8 is a flowchart illustrating a creation processing procedure according to the third embodiment.
Figure 9:
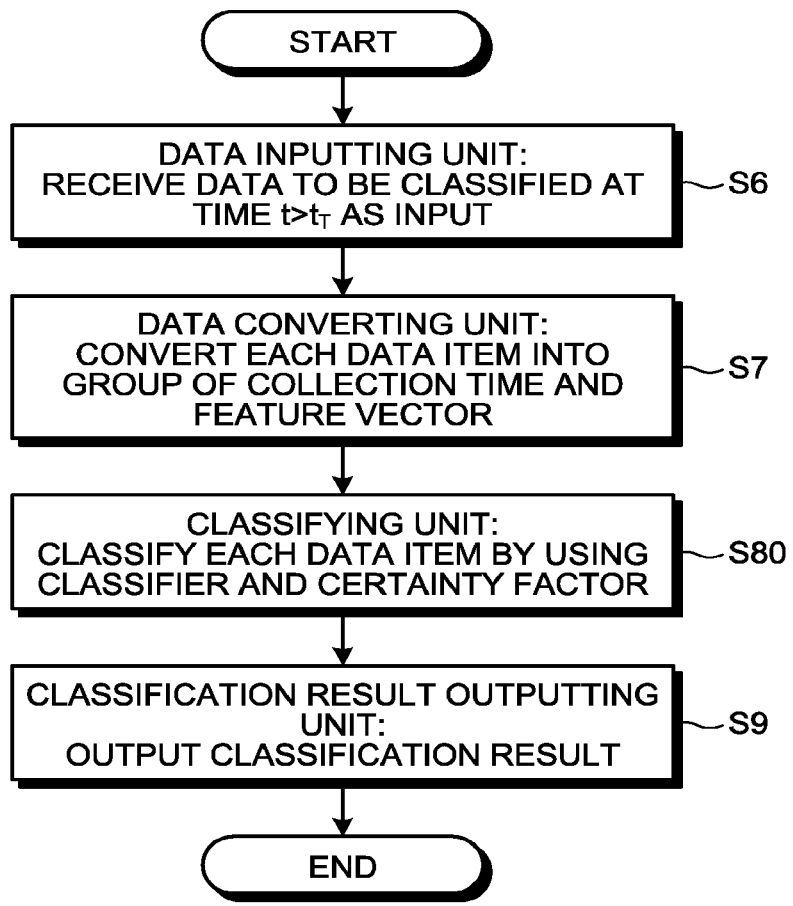
FIG. 9 is a flowchart illustrating a classification processing procedure according to the third embodiment.

Next, FIG. 8 is a flowchart exemplifying a creation processing procedure of the present embodiment. As illustrated in FIG. 8, the learning unit 13 learns the classification criterion of the classifier at time until the time $t_T$ and the time series model representing the time series change of the classifier (Step S30). In this case, the present embodiment is different from the first embodiment described above in that the classifier creating unit 14 predicts the classification criterion of the classifier at $t > t_T$ together with the certainty factor (Step S40) and stores the classifier at $t > t_T$ and the certainty factor in the classifier storing unit 15 (Step S50). Furthermore, FIG. 9 is a flowchart exemplifying a classification processing procedure of the present embodiment. As illustrated in FIG. 9, the present embodiment is different from the first embodiment described above in that the classifying unit 23 classifies data by using the classifier at the collection time of the received data together with the certainty factor (Step S80).

Figure 10:
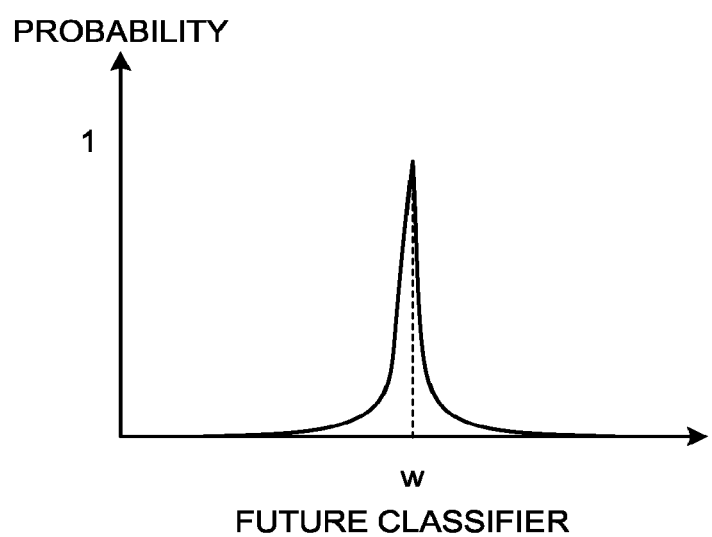
FIG. 10 is a descriptive graph for describing an effect of creation processing by the creating apparatus according to the third embodiment.
Figure 11:
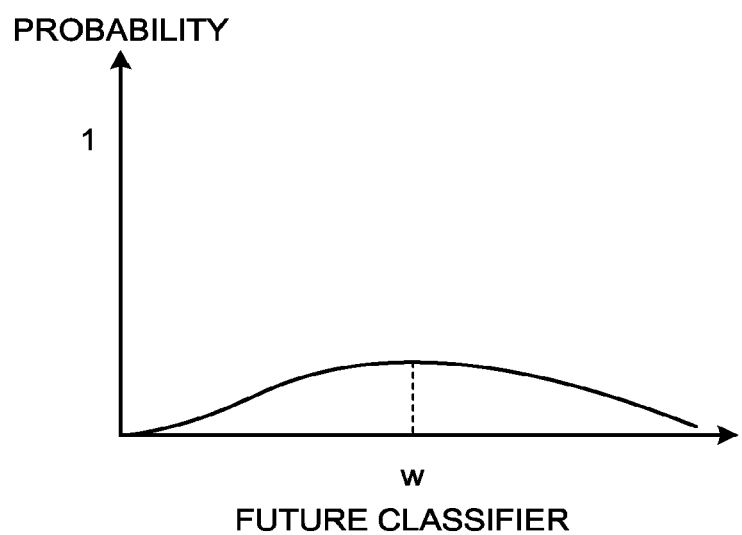
FIG. 11 is a descriptive graph for describing the effect of the creation processing by the creating apparatus according to the third embodiment.

In this way, according to the creating apparatus 1 of the present embodiment, a future classification criterion is predicted together with the certainty factor. That is, as exemplified in FIGS. 10 and 11, the probability distribution of the predictable classification criterion w of the future classifier differs variously. As exemplified in FIG. 10, in a case where the variance of the probability of the classification criterion w is small, the classification criterion w can be predicted with a high probability, that is, a high certainty factor. On the other hand, as illustrated in FIG. 11, in a case where the variance of the probability of the classification criterion w is large, the probability of the classification criterion w, that is, the certainty factor is low. Therefore, by using the classifier in consideration of the certainty factor of the predicted classification criterion w, classification with high accuracy can be performed.

Fourth Embodiment

Figure 12:
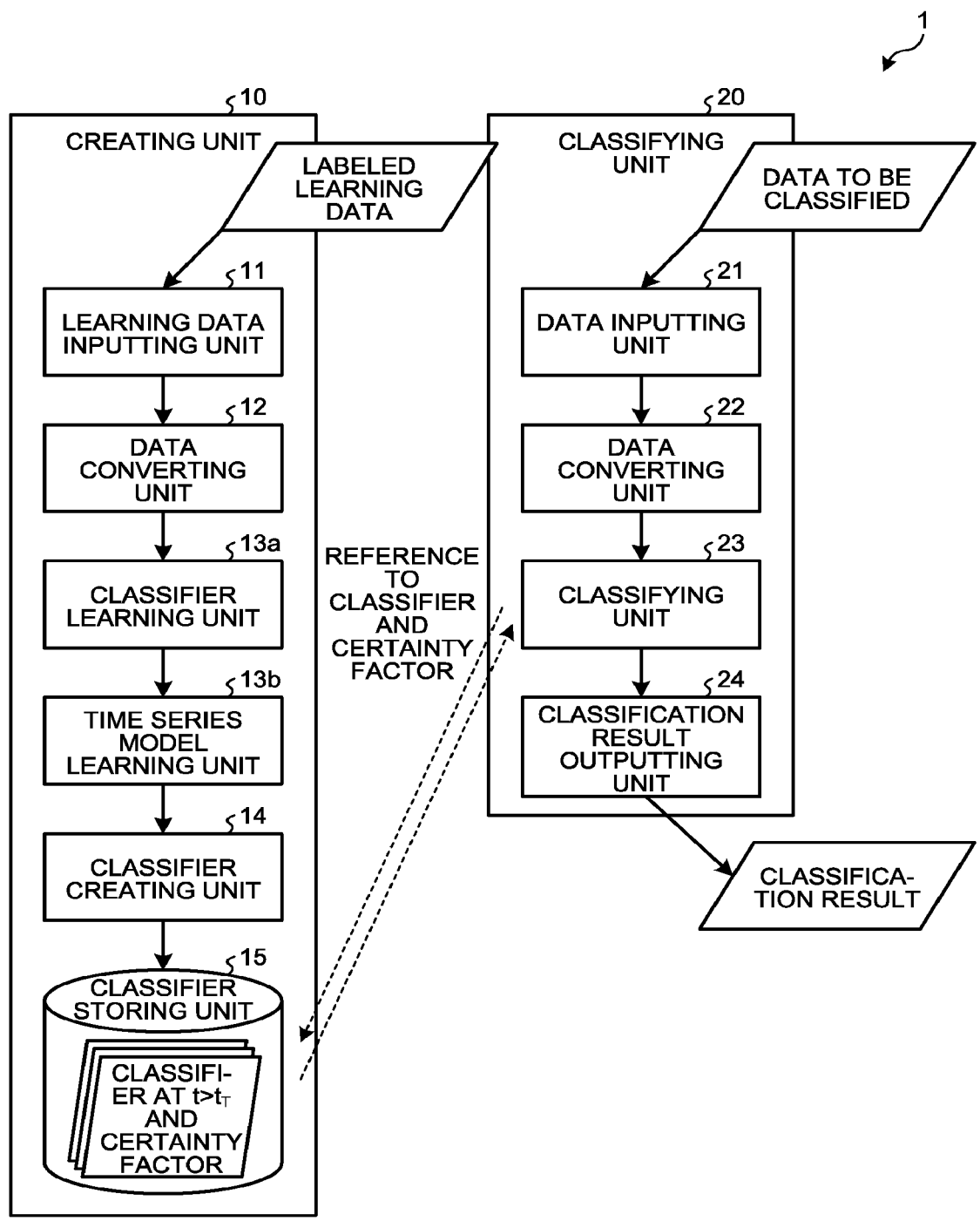
FIG. 12 is a schematic diagram illustrating a schematic configuration of a creating apparatus according to a fourth embodiment.

The learning unit 13 of the third embodiment described above may be separated into a classifier learning unit 13a and a time series model learning unit 13b. FIG. 12 is a diagram exemplifying a schematic configuration of a creating apparatus 1 according to the fourth embodiment. The present embodiment is different only in that a classifier learning unit 13a and a time series model learning unit 13b perform, in a sharing manner, the processing by the learning unit 13 of the third embodiment described above. Since other processing is the same as that in the third embodiment, the description thereof will be omitted.

Note that in the present embodiment, as in the third embodiment, logistic regression is applied to a model of a classifier, and Gaussian Processes is applied to a time series model representing a time series change of a classification criterion of the classifier. Note that the time series model is not limited to Gaussian Processes and may be a model such as a VAR model.

The classifier learning unit 13a learns the classification criterion of the classifier at each time point in the past until the present. Specifically, a parameter $w_t$ representing the classification criterion of the classifier is obtained as a point that maximizes a log posterior distribution illustrated in the following formula (35) by using a maximum a posteriori (MAP) estimation.

$$\log P(w_t - X_t, Y_t, w_{t-1}, \theta)$$
$$= \log p(Y_t | w_t, X_t) + \log p(w_t | w_{t-1}, \theta) \quad (35)$$

where $X_t = \{x_n^t\}_{n=1}^{N_t}$ $Y_t = \{y_n^t\}_{n=1}^{N_t}$ $p(w_t | w_{t-1}, \theta) = N(w_{t-1}, \theta^{-1} I_d)$ Regarding the parameter $w_t$ at each point of time t from time $t_1$ to the time $t_T$, the classifier learning unit 13a executes the MAP estimation described above in order of the parameters $w_t$ from the time $t_1$ to the time $t_T$. As a result, the classifier learning unit 13a can obtain the classifiers until the time $t_T$.

Furthermore, as in the third embodiment described above, the time series model learning unit 13b learns the time series change of the classification criterion of the classifier on the basis of the classifiers at time until the time $t_T$ obtained by the classifier learning unit 13a.

Figure 13:
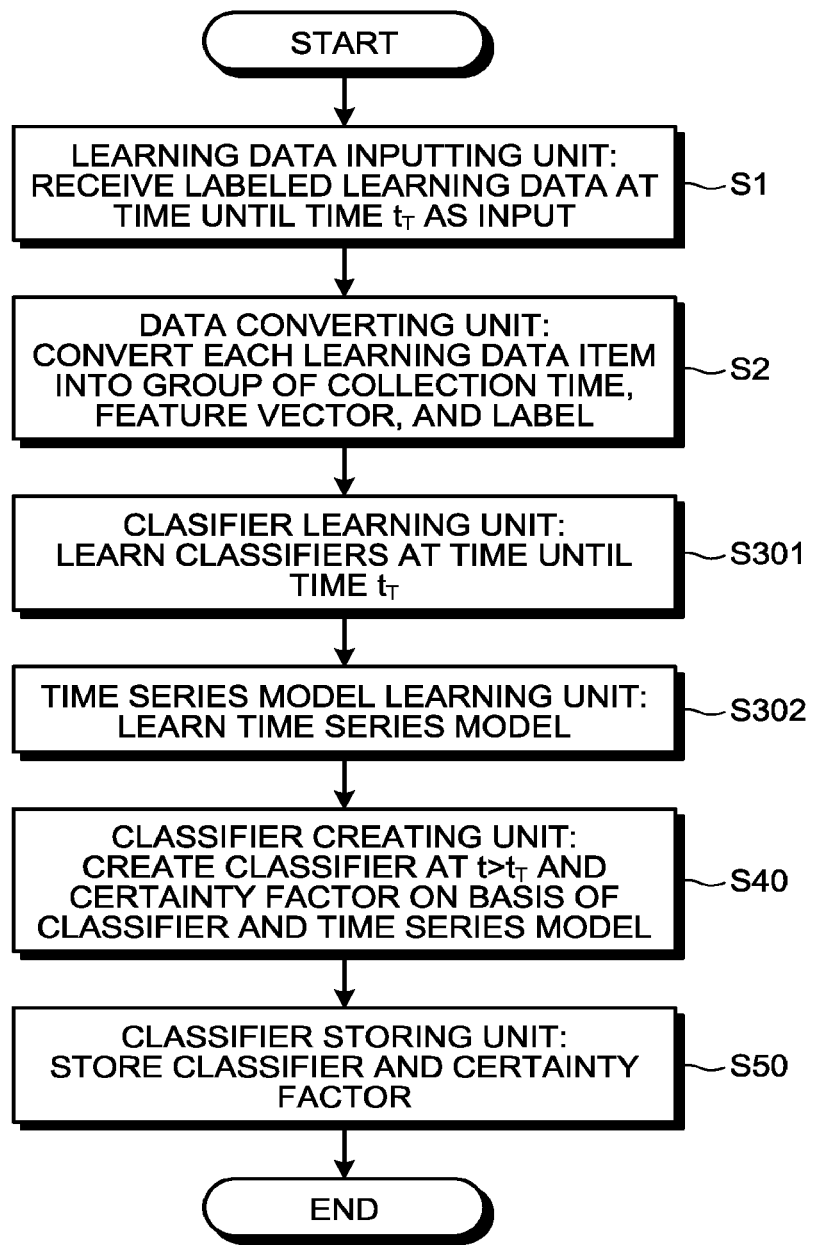
FIG. 13 is a flowchart illustrating a creation processing procedure according to the fourth embodiment.

FIG. 13 is a flowchart exemplifying a creation processing procedure of the present embodiment. The only differences from the third embodiment described above are the processing of Step S301 and the processing of Step S302.

In the processing of Step S301, the classifier learning unit 13a learns the classification criterion of the classifier at the time $t_T$ by using the labeled learning data at collection time $t=t_1$ to $t_T$. For example, the parameter $w_t$ at each point of time $t$ until the time $t_T$ of the logistic regression model is obtained.

In the processing of Step S302, the time series model learning unit 13b learns the time series model representing the time series change of the classification criterion by using the classification criteria of the classifiers at time until the time $t_T$ obtained by the classifier learning unit 13a. For example, a parameter θ of Gaussian Processes is obtained.

In this way, according to the creating apparatus 1 of the present embodiment, as in the second embodiment, the classification criterion of the classifier and the time series change of the classification criterion are learned separately. As a result, for example, even in a case where the number of pieces of labeled learning data is large, the processing load on each functional unit can be made smaller and the processing can be performed in a shorter time than in a case where the classification criterion of the classifier and the time series change of the classification criterion are learned at the same time.

(Program)

Furthermore, it is also possible to create a program written in a language in which a computer can execute the processing executed by the creating apparatus 1 according to the embodiment described above. As one embodiment, the creating apparatus 1 can be implemented by causing a desired computer to install a creating program that executes the creation processing described above as package software or online software. For example, by causing an information processing apparatus to execute the creating program described above, an information processing apparatus can function as the creating apparatus 1. The information processing apparatus mentioned here includes a desktop type or note type personal computer. Furthermore, in addition to the above, the information processing apparatus includes, in its category, a mobile communication terminal such as a smart phone, a mobile phone, and a personal handyphone system (PHS) and further a slate terminal such as a personal digital assistant (PDA), and the like. Furthermore, it is also possible to use a terminal device used by a user as a client and implement the creating apparatus 1 as a server device that provides the client with a service related to the creation processing described above. For example, the creating apparatus 1 is implemented as a server device that provides a creation processing service that takes labeled learning data as an input and outputs a classifier. In this case, the creating apparatus 1 may be implemented as a Web server or may be implemented as a cloud that provides the service related to the creation processing described above by outsourcing. An example of a computer that executes a creating program that achieves functions similar to those of the creating apparatus 1 will be described below.

Figure 14:
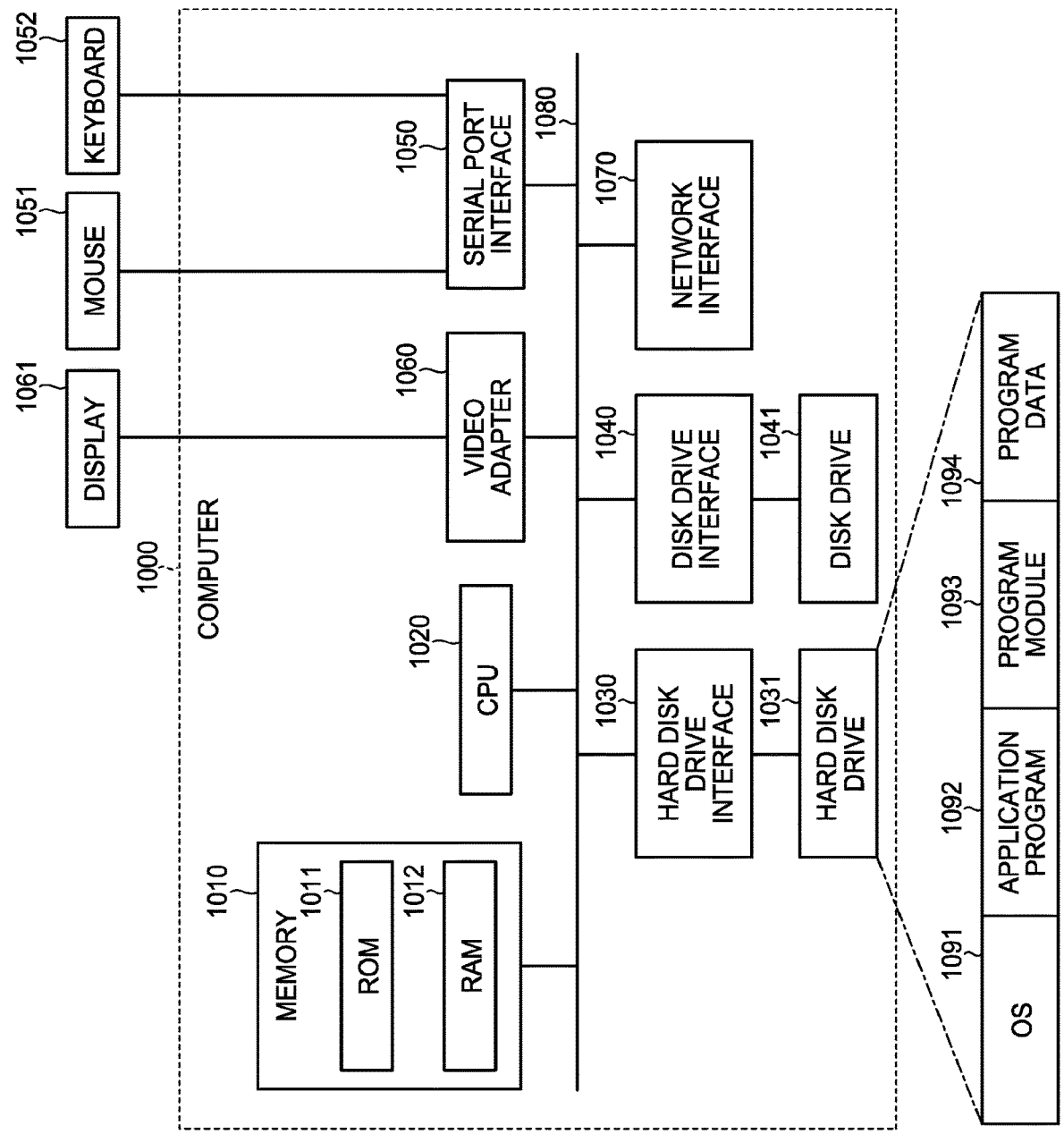
FIG. 14 is a diagram exemplifying a computer that executes a creating program.

As illustrated in FIG. 14, a computer 1000 that executes the creating program includes, for example, a memory 1010, a central processing unit (CPU) 1020, a hard disk drive interface 1030, a disk drive interface 1040, a serial port interface 1050, a video adapter 1060, and a network interface 1070. Each of these components is connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. A removable storage medium such as a magnetic disk or an optical disc is inserted in the disk drive 1041. For example, a mouse 1051 and a keyboard 1052 are connected to the serial port interface 1050. For example, a display 1061 is connected to the video adapter 1060.

Here, as illustrated in FIG. 14, the hard disk drive 1031 stores, for example, an operating system (OS) 1091, an application program 1092, a program module 1093, and program data 1094. Each of the pieces of data described in the above embodiment is stored, for example, in the hard disk drive 1031 or the memory 1010.

Furthermore, the creating program is stored in the hard disk drive 1031, for example, as the program module 1093 in which a command to be executed by the computer 1000 is written. Specifically, the program module 1093 in which each kind of processing executed by the creating apparatus 1 described above in the embodiment is written is stored in the hard disk drive 1031.

Furthermore, data used for information processing by the creating program is stored as the program data 1094, for example, in the hard disk drive 1031. Then, the CPU 1020 reads out the program module 1093 and the program data 1094 stored in the hard disk drive 1031 to the RAM 1012 as necessary and executes each procedure described above.

Note that the program module 1093 and the program data 1094 relating to the creating program are not limited to being stored in the hard disk drive 1031, but, for example, may be stored in a removable storage medium and read out by the CPU 1020 via the disk drive 1041 or the like. Alternatively, the program module 1093 and the program data 1094 relating to the creating program may be stored in another computer connected via a network such as a local area network (LAN) and a wide area network (WAN) and read out by the CPU 1020 via the network interface 1070.

The embodiments to which the invention made by the present inventors is applied have been described above, but the present invention is not limited by description and drawings that form a part of the disclosure of the present invention according to the present embodiment. That is, all other embodiments, examples, operation techniques, and the like made by those skilled in the art and the like on the basis of the present embodiment are included in the scope of the present invention.

REFERENCE SIGNS LIST

1 CREATING APPARATUS
10 CREATING UNIT
11 LEARNING DATA INPUTTING UNIT
12 DATA CONVERTING UNIT
13 LEARNING UNIT
13a CLASSIFIER LEARNING UNIT
13b TIME SERIES MODEL LEARNING UNIT
14 CLASSIFIER CREATING UNIT
15 CLASSIFIER STORING UNIT
20 CLASSIFYING UNIT
21 DATA INPUTTING UNIT
22 DATA CONVERTING UNIT
23 CLASSIFYING UNIT
24 CLASSIFICATION RESULT OUTPUTTING UNIT

The invention claimed is:

1. A creating apparatus that creates a classifier that outputs a label representing an attribute of input data, the creating apparatus comprising:
a memory; and
a processor coupled to the memory and programmed to execute a process comprising:
firstly learning a decision boundary of a classifier at each time point in the past;

secondly learning a time-series model representing a time series change of the decision boundary; and predicting the decision boundary at a future time point by using the learned time-series model.

2. The creating apparatus according to claim 1, wherein the firstly learning and the secondly learning use data for learning to which the label is given and that is collected until the present.

3. The creating apparatus according to claim 1, wherein the data is not continuous at a fixed discrete time interval.

4. The creating apparatus according to claim 1, wherein the predicting further derives a probability of a prediction of the predicted decision boundary.

5. The creating apparatus according to claim 1, wherein processing of the secondly learning is performed after processing of the firstly learning.

6. The creating apparatus according to claim 1, wherein processing of the firstly learning and processing of the secondly learning are performed at the same time.

7. A creating method executed by a creating apparatus that creates a classifier that outputs a label representing an attribute of input data, the creating method comprising:

learning a decision boundary of a classifier at each time point in the past;

learning a time-series model representing a time series change of the classification criterion; and predicting the decision boundary at a future time point by using the learned time-series model.

8. A non-transitory computer-readable recording medium including a stored creating program that causes a computer to execute a process comprising:

learning a decision boundary of a classifier at each time point in the past;

learning a time-series model representing a time series change of the decision boundary; and predicting the decision boundary at a future time point by using the learned time-series model.

* * * * *